US010871998B2

(12) United States Patent
Parees et al.

(10) Patent No.: US 10,871,998 B2
(45) Date of Patent: Dec. 22, 2020

(54) USAGE INSTRUMENTED WORKLOAD SCHEDULING

(71) Applicant: Red Hat, Inc., Raleigh, NC (US)

(72) Inventors: Benjamin Michael Parees, Durham, NC (US); Derek Wayne Carr, Apex, NC (US); Clayton Palmer Coleman, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 333 days.

(21) Appl. No.: 15/874,553

(22) Filed: Jan. 18, 2018

(65) Prior Publication Data
US 2019/0220319 A1 Jul. 18, 2019

(51) Int. Cl.
*G06F 9/48* (2006.01)
*G06F 9/50* (2006.01)

(52) U.S. Cl.
CPC .......... *G06F 9/5038* (2013.01); *G06F 9/4881* (2013.01); *G06F 9/505* (2013.01); *G06F 2209/503* (2013.01); *G06F 2209/5016* (2013.01); *G06F 2209/5021* (2013.01)

(58) Field of Classification Search
CPC ...... G06F 9/5038; G06F 9/4881; G06F 9/505; G06F 2209/5016; G06F 2209/5021; G06F 2209/503
See application file for complete search history.

(56) References Cited

U.S. PATENT DOCUMENTS

| 6,757,897 | B1 * | 6/2004 | Shi | G06F 9/4843 |
| | | | | 710/240 |
| 8,635,216 | B1 * | 1/2014 | Hepworth | G06F 16/9535 |
| | | | | 707/733 |
| 8,756,597 | B2 | 6/2014 | Srinivasan et al. | |
| 9,086,897 | B2 * | 7/2015 | Oh | G06F 9/452 |
| 9,384,061 | B1 * | 7/2016 | Deivanayagam | G06F 9/5083 |
| 9,507,631 | B2 | 11/2016 | Chen et al. | |
| 9,645,852 | B2 * | 5/2017 | Anderson | G06F 9/5011 |
| 2004/0059628 | A1 * | 3/2004 | Parker | G06Q 30/02 |
| | | | | 705/12 |

(Continued)

OTHER PUBLICATIONS

Poggi et al. Self-adaptive utility-based web session management. [online] Elsevier., pp. 1712-1721. Retrieved From the Internet <http://personals.ac.upc.edu/npoggi/publications/N.%20Poggi%20-%20Self-adaptive%20utility-based%20web%20session%20management.pdf> (Year: 2008).*

(Continued)

*Primary Examiner* — Emerson C Puente
*Assistant Examiner* — Jonathan R Labud
(74) *Attorney, Agent, or Firm* — K&L Gates LLP

(57) ABSTRACT

Usage instrumented workload scheduling is disclosed. For example, a plurality of nodes host first and second pluralities of guests. An orchestrator includes a usage monitor, a workload classifier, and a scheduler, and executes on a processor to track, by the usage monitor, respective usage patterns of a plurality of accounts including a first account. A first workload is received from the first account, which has a first account factor based on the respective usage patterns of the first account. The first workload is assigned by the workload classifier to a first workload type of a plurality of workload types. The first workload is assigned by the scheduler to the first plurality of guests based on the first account factor and the first workload type.

19 Claims, 9 Drawing Sheets

(56) References Cited

U.S. PATENT DOCUMENTS

| | | | | |
|---|---|---|---|---|
| 2009/0327610 | A1* | 12/2009 | David | G06F 9/3851 |
| | | | | 711/119 |
| 2010/0153957 | A1* | 6/2010 | Xu | G06F 9/505 |
| | | | | 718/102 |
| 2011/0219373 | A1* | 9/2011 | Nam | G06F 9/455 |
| | | | | 718/1 |
| 2013/0185729 | A1* | 7/2013 | Vasic | G06F 9/5072 |
| | | | | 718/104 |
| 2013/0205297 | A1* | 8/2013 | Shimogawa | G06F 9/45558 |
| | | | | 718/1 |
| 2013/0275376 | A1* | 10/2013 | Hudlow | H04L 67/34 |
| | | | | 707/639 |
| 2014/0173286 | A1* | 6/2014 | Novak | G06F 21/316 |
| | | | | 713/176 |
| 2016/0147575 | A1 | 5/2016 | Singh et al. | |
| 2018/0039516 | A1* | 2/2018 | Biran | G06F 9/44505 |

OTHER PUBLICATIONS

Pod Priority and Preemption; https://kubernetes.io/docs/concepts/configuration/pod-priority-preemption/, 2017, retrieved Jan. 1, 2018, pp. 1-7.

Priority based resource allocation model for cloud computing; bu K. C. Gouda, Radhika T V, and Akshatha M; International Journal of Science, Engineering and Technology Researc; (IJSETR), vol. 2, Issue 1, Jan. 2013, ISSN: 2278-7798, pp. 215-219.

Google Container Engine—Kubernetes 1.8 takes advantage of the cloud built for containers; by Dan Paik, Product Manager, Container Engine; Google Cloud Platform Blog; Sep. 29, 2017; pp. 1-19.

Priority IO Scheduling in the Cloud; by Filip Blagojevic, Cyril Guyot, Qingbo Wang, Timoth Tsai, Robert Mateescu and Zvonimir Bandic; HGST Research, San Jose, CA; 2013, pp. 1-6.

Admin-set-resource-quota-dynamicaly; OpenStack; https://wiki.openstack.org/wiki/Admin-set-resource-quota-dynamically; retrieved Jan. 2, 2018; pp. 1-3.

* cited by examiner

USAGE INSTRUMENTED WORKLOAD SCHEDULING

BACKGROUND

The present disclosure generally relates to scheduling workloads in cloud environments. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware, enabling additional flexibility and scalability of deployment. Multiple containers may also be clustered together to perform a more complex function than the respective containers are capable of performing individually. In an example, a container and/or a cluster of containers may be implemented specifically to execute certain specific workloads. In many shared systems (e.g., multi-tenant clouds), workloads are constantly received and prioritization between workloads may allow for increased usage of compute resources and/or faster generation of workload results. Accordingly, workload scheduling and prioritization directly impacts the computing efficiency in cloud environments.

SUMMARY

The present disclosure provides a new and innovative system, methods and apparatus for usage instrumented workload scheduling. In an example, a plurality of nodes host first and second pluralities of guests. An orchestrator includes a usage monitor, a workload classifier, and a scheduler, and executes on a processor to track, by the usage monitor, respective usage patterns of a plurality of accounts including a first account. A first workload is received from the first account, which has a first account factor based on the respective usage patterns of the first account. The first workload is assigned by the workload classifier to a first workload type of a plurality of workload types. The first workload is assigned by the scheduler to the first plurality of guests based on the first account factor and the first workload type.

Additional features and advantages of the disclosed method and apparatus are described in, and will be apparent from, the following Detailed Description and the Figures.

DETAILED DESCRIPTION OF EXAMPLE EMBODIMENTS

Figure 1:
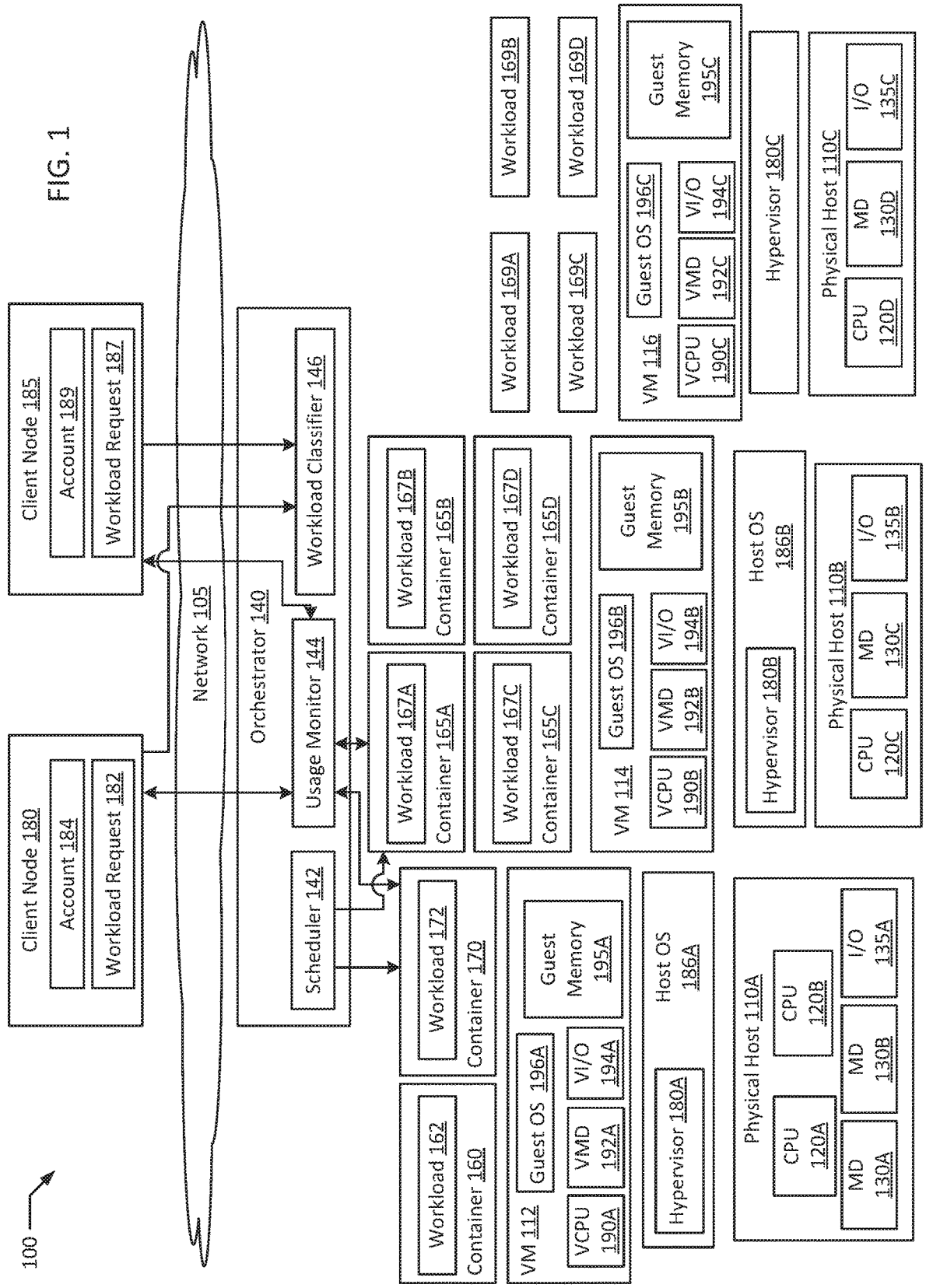
FIG. 1 is a block diagram of a usage instrumented workload scheduling system according to an example of the present disclosure.

In computer systems implementing virtualization, for example in the form of isolated guests, typically, virtual machines and/or containers are used. In an example, a virtual machine ("VM") may be a robust simulation of an actual physical computer system utilizing a hypervisor to allocate physical resources to the virtual machine (e.g., Red Hat® Enterprise Virtualization). In some examples, a container based virtualization system such as Red Hat® OpenShift® or Docker® may be advantageous, as container based virtualization systems may be lighter weight than systems using virtual machines with hypervisors. In the case of containers, oftentimes a container will be hosted on a physical host or virtual machine that already has an operating system (e.g., Red Hat® Enterprise Linux®) executing, and the container may be hosted on the operating system of the physical host or VM. In large scale implementations, container schedulers, such as those included in container orchestrators (e.g., Kubernetes®), generally respond to frequent container startups and cleanups with low latency. Containers may enable wide spread, parallel deployment of computing power for specific tasks. In a typical example, a container may be instantiated to process a specific task and reaped after the task is complete.

Due to economies of scale, containers tend to be more advantageous in large scale hardware deployments where the relatively fast ramp-up time of containers enables for more flexibility for many different types of applications to share computing time on the same physical hardware, for example, in a private or multi-tenant cloud environment. In some examples, where containers from a homogenous source are deployed, it may be advantageous to deploy containers directly on physical hosts. In some multi-tenant clouds, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host. In an example, a physical and/or virtual host node may host hundreds of containers, each of which may independently execute tasks.

In a shared environment such as a multi-tenant cloud, oftentimes many different types of computing workloads may be requested substantially simultaneously, such that the various workloads may be queued for execution by the system. In an example, the various workloads may further have different timing or other prioritization requirements. However, in many instances, especially with multi-user, multi-tenant environments, an administrator of the environment may have limited insight into a particular workload prior to analyzing the workload for scheduling. In an example, effective scheduling may significantly increase utilization of hardware, for example, by ensuring that low priority tasks and workloads are deferred behind higher priority workloads. In an illustrative example, on a given set of physical hardware, if each task is executed as soon as possible when received, the system may reach maximum capacity and become unable to receive new tasks during a period of peak load (e.g., business hours) and may be completely idle in other time periods (e.g., overnight). However, if several large, time consuming, but non-urgent tasks are deferred to an overnight batch process, the computing capacity utilized by those tasks may be available during business hours for other more urgent tasks. In practice, oftentimes spikes in usage may occur on a much more granular basis, for example, in a matter of minutes, seconds, even milliseconds.

A typical solution in managing user expectation is to schedule workloads based on user identified priority. However, many times self-identified priority may be misused or abused. For example, if every task is marked urgent, no task receives prioritization. A simplistic solution may then involve artificial prioritization of certain accounts by reserving computing resources for those accounts, oftentimes based on identified commercial importance. In many cases, however, such reservation models result in significant idle time on the highest performance hardware in order to account for potential spikes in usage by those pre-identified VIPs. Such scheduling models may often also prioritize workloads that do not require prioritized performance by defaulting low priority workloads from high-priority users to reserved hardware.

The present disclosure aims to address the performance and efficiency deficiencies inherent in scheduling workloads on a multi-tenant environment through usage instrumented workload scheduling. For example, both a source of a workload (e.g., a user account, system account, etc.) as well as a workload type may be factored into scheduling the workload for execution in the computing environment. Historical usage patterns by a user account may be recorded and analyzed, including being compared to usage patterns of other user accounts of the system. In addition, timing expectations of a given workload may be measured from factors such as whether a user is actively logged in and entering commands. Oftentimes a given workload may see repeated execution in a cloud environment and therefore historical performance patterns of the workload may also be recorded and tracked to identify specific computing resource types that benefit execution of a specific workload. In an example, usage and workload type analysis of a given workload request may be performed and a workload classification may be stored and associated with the workload (e.g., as metadata) that may be further utilized when necessary to evict workloads in favor of higher priority workloads. In an example, usage instrumented workload scheduling enables higher utilization of hardware while also maintaining high-priority, low-latency responsiveness for tasks requiring such priority by leveraging compute capacity otherwise wasted by being reserved for high-priority usage.

FIG. 1 is a block diagram of a usage instrumented workload scheduling system according to an example of the present disclosure. The system 100 may include one or more physical hosts 110A-C. Each physical host 110A-C may in turn include one or more physical processors (e.g., CPU 120A-D) communicatively coupled to memory devices (e.g., MD 130A-D) and input/output devices (e.g., I/O 135A-C). As used herein, physical processor or processors 120A-D refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 130A-D refer to volatile or non-volatile memory devices, such as RAM, ROM, EEPROM, or any other device capable of storing data. As discussed herein, I/O devices 135A-C refer to devices capable of providing an interface between one or more processor pins and an external device, the operation of which is based on the processor inputting and/or outputting binary data. CPUs 120A-D may be interconnected using a variety of techniques, ranging from a point-to-point processor interconnect, to a system area network, such as an Ethernet-based network. Local connections within each physical host 110A-C, including the connections between processors 120A-B and a memory device 130A-B and between processors 120A-B and I/O device 135A may be provided by one or more local buses of suitable architecture, for example, peripheral component interconnect (PCI).

In an example, physical hosts 110A-C may run one or more isolated guests, for example, VMs 112, 114 and 116, containers 160, 165A-D, and 170. In an example, any of containers 160, 165A-D, and 170 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VMs 112, 114 and 116 may be VMs executing on physical hosts 110A-B. In an example, containers 160 and 170 may execute on VM 112 while containers 165A-D may execute on VM 114. In an example, orchestrator 140 including scheduler 142, usage monitor 144, and workload classifier 146 may execute either independently or within a container. In an example, any of containers 160, 165A-D, and 170 may be executing directly on either of physical hosts 110A-C without a virtualized layer in between. In an example, isolated guests may be further nested in other isolated guests. For example, VMs 112 and 114 may host containers (e.g., containers 160, 165A-D, and 170). In addition, containers and/or VMs may further host other guests necessary to execute their configured roles (e.g., a nested hypervisor or nested containers). For example, a VM (e.g., VM 112, 114, or 116) and/or a container (e.g., containers 160, 165A-D, and 170) may further host a Java® Virtual Machine ("JVM") if execution of Java® code is necessary.

System 100 may run one or more VMs (e.g., VMs 112, 114, and 116), by executing a software layer (e.g., hypervisor 180A-C) above the hardware and below the VMs 112 and 114, as schematically shown in FIG. 1. In an example, the hypervisors 180A-B may be components of respective host operating systems 186A-B executed by the system 100. In another example, the hypervisors 180A-B may be provided by an application running on respective operating systems 186A-B. In an example, hypervisor 180C may run directly on physical hosts 110C without an operating system beneath hypervisor 180C. Hypervisors 180A-C may virtualize the physical layer, including processors, memory, and I/O devices, and present this virtualization to VMs 112, 114, and 116 as devices, including virtual central processing units ("VCPUs") 190A-C, virtual memory devices ("VMDs") 192A-C, virtual input/output ("VI/O") devices 194A-C, and/or guest memories 195A-C. In an example, a container may execute directly on host OSs 186A-B without an intervening layer of virtualization.

In an example, a VM 112 may be a virtual machine and may execute a guest operating system 196A which may utilize the underlying VCPU 190A, VIVID 192A, and VI/O 194A. One or more isolated guests (e.g., containers 160 and 170) may be running on VM 112 under the respective guest operating system 196A. Processor virtualization may be implemented by the hypervisor 180A scheduling time slots on one or more physical processors 120A such that from the guest operating system's perspective those time slots are scheduled on a virtual processor 190A.

VM 112 may run on any type of dependent, independent, compatible, and/or incompatible applications on the underlying hardware and host operating system 186A. In an example, containers 160 and 170 running on VM 112 may be dependent on the underlying hardware and/or host operating system 186A. In another example, containers 160 and 170 running on VM 112 may be independent of the underlying hardware and/or host operating system 186. In an example, containers 160 and 170 running on VM 112 may be compatible with the underlying hardware and/or host operating system 186A. Additionally, containers 160 and 170 running on VM 112 may be incompatible with the underlying hardware and/or OS. The hypervisor 180A may manage memory for the host operating system 186A as well as memory allocated to the VM 112 and guest operating system 196A such as guest memory 195A provided to guest OS 196. In an example, VMs 114 and 116 and their associated components guest OSes 196B-C, VCPU 190B-C, VIVID 192B-C, VI/O 194B-C, and guest memory 195B-C may perform similar corresponding roles to the components in VM 112. Similarly, hypervisor 180B-C and host OS 186B may function in similar roles as related to VMs 114 and 116 as hypervisor 180A and host OS 186A do to VM 112. In an example, containers 165A-D may execute on VM 114 or directly on physical hosts 110B-C.

In an example, network 105 may be any form of suitable network for enabling communications between computing devices, for example, a public network (e.g., the Internet), a private network (e.g., a local area network (LAN) or wide area network (WAN)), or a combination thereof. In an example, orchestrator 140 may be a component responsible for assigning compute tasks executed in containers to various host nodes (e.g., VMs 112, 114, and 116, physical hosts 110A-C). In the example, orchestrator 140 is responsible for launching containers (e.g., containers 160, 165A-D, and 170) on the selected hosts. In an example, orchestrator 140 may be a virtualization orchestrator (e.g., Red Hat® OpenShift®, Kubernetes®) that may include additional subcomponents responsible for additional tasks, for example, scheduler 142, usage monitor 144, and workload classifier 146. In an example, orchestrator 140, scheduler 142, usage monitor 144, and/or workload classifier 146 may be implemented via any form of executable code (e.g., executable file, script, application, service, daemon, etc.). In an example, scheduler 142 may be a container scheduler scheduling the deployment of containers to hosts (e.g., VMs 112, 114, and 116, physical hosts 110A-C). In an example, scheduler 142 may assign computing tasks (e.g., workloads 162, 167A-D, 169A-D, 172) to hosts or guests capable of executing such computing tasks (e.g., containers 160, 165A-D, 170, VMs 112, 114, 116, physical hosts 110A-C).

In an example, a workload (e.g., workloads 162, 167A-D, 169A-D, 172) may be any computing task that utilizes computing resources. For example, a workload (e.g., workloads 169A-D) assigned to a VM (e.g., VM 116) may be a new instance of a container to be hosted on VM 116. In such an example, workloads 169A-D may be additional instances of containers hosted on other VMs (e.g., additional instances of containers 165A-D). In another example, a workload (e.g., workloads 162, 167A-D, 169A-D, 172) may be a request to build a new executable code, for example, for an application or for an image file used to launch a container or group of containers (e.g., Kubernetes® pod). In an example, one or more workloads may provide a service or microservice for other applications in the system. In an example, a workload (e.g., workloads 162, 167A-D, 169A-D, 172) may also be a discrete processing task assigned to a host capable of performing the processing task (e.g., containers 160, 165A-D, 170, VMs 112, 114, 116, physical hosts 110A-C). For example, a workload may be a request (e.g., workload requests 182 and 187) for data (e.g., a web page request, image build request, container launching request, batch job request, etc.) from a client device (e.g., client nodes 180 and 185). In an example, workloads 162, 167A-D, 169A-D, 172 may be processed by any form of executable code (e.g., executable file, script, application, service, daemon).

In an example, client nodes 180 and 185 may be any form of network accessible device (e.g., phone, tablet, laptop, desktop, server, Internet of Things ("IOT") device, etc.) connected to system 100 through network 105. In an example, client nodes 180 and 185 may have their own processors, memories, I/Os, and/or OS similar to physical hosts 110A-C. In an example, client nodes 180 and 185 accessing system 100 may connect to a network facing component such as a load balancer, which may be a component of orchestrator 140 for routing requests from client nodes 180 and 185 to appropriate services for handling the requests. In an example, a Domain Name Server ("DNS") may resolve an internet address into an Internet Protocol ("IP") address for orchestrator 140 or an associated web portal or load balancer. In an example, a user of client nodes 180 and 185 may log into an account 184 or 189 to access services provided by orchestrator 140. In the example, accounts 184 and 189 may issue workload requests 182 and 187 to orchestrator 140. In an example, usage monitor 144 may track interactions between client node 180 and 185 with orchestrator 140. In an example, usage monitor 144 may also track workload execution (e.g., on containers 160, 165A-D, 170, VMs 112, 114, 116, physical hosts 110A-C).

In an example, system 100 includes container and/or workload hosting environments with varying levels of compute resources available to the workloads executing in the respective hosting environments. For example, physical host 110A hosting VM 112 may be a more robust physical host than physical hosts 110B-C. In the example, physical host 110A may be quipped with two CPUs (e.g., CPUs 120A-B) and two memory devices (e.g., MDs 130A-B) as compared to one CPU (e.g., CPU 120C or 120D) and one memory device (e.g., MD 130C or 130D) in each of physical hosts 110B-C. In an example, CPU 120A may be higher performance (e.g., more cores or higher clock speed) than CPU 120C. In an example, MD 130A may be a higher performance storage device (e.g., persistent memory, solid state drive, etc.) vs. MD 130C (e.g., hard disk drive). In another example, MDs 130A-B may be combined, for example in a RAID array for additional data security and/or performance. In various examples, compute resources such as network bandwidth, network interfaces, graphical processors, memory size and speed, CPU availability and speed, etc. may be configured differently between various hosting environments (e.g., physical hosts 110A-C).

In an example, it is unlikely for all of the guests in a given hosting environment to be operating under peak load simultaneously. For example, if physical host 110A may host 200 guests at peak load, but the 200 guests only require 20% of the compute resources of physical host 110A under normal load, physical host 110A may be severely underutilized. In such an example, 500 guests may be deployed to physical host 110A, reserving around 50% of the compute capacity of physical host 110A for spikes in usage by a subset of the 500 guests. Therefore, in such an example, the compute resources of physical host 110A are overcommitted to increase average usage. In an example, the more overcommitted a given host's resources become, the more likely that the host can completely run out of resources during a spike in usage, resulting in significant processing delays, errors, and/or crashes for the host and/or its guests. In an example, physical host 110A may be configured to allow less overcommit than physical hosts 110B-C (e.g., 800 guests may be deployed to physical host 110B). In such examples, physical host 110A may represent a high performance node for high-priority workloads (e.g., workloads 162 and 172). In various examples, different hosting environments may be configured to preferentially handle different types of workloads based on hardware configuration. For example, a node with graphical processing units may execute certain mathematical workloads faster than one without, while having high performance persistent memory may be important for data retrieval from a local data cache, but unimportant for a node that executes records analysis in overnight batch jobs (but a redundant storage system such as RAID may be important to preserve vital records). In an example, different hosting environments (e.g., physical hosts 110A-C) may be configured for preferentially handling different types of workloads (e.g., workloads 162, 167A-D, 169A-D, and 172).

Figure 2A:
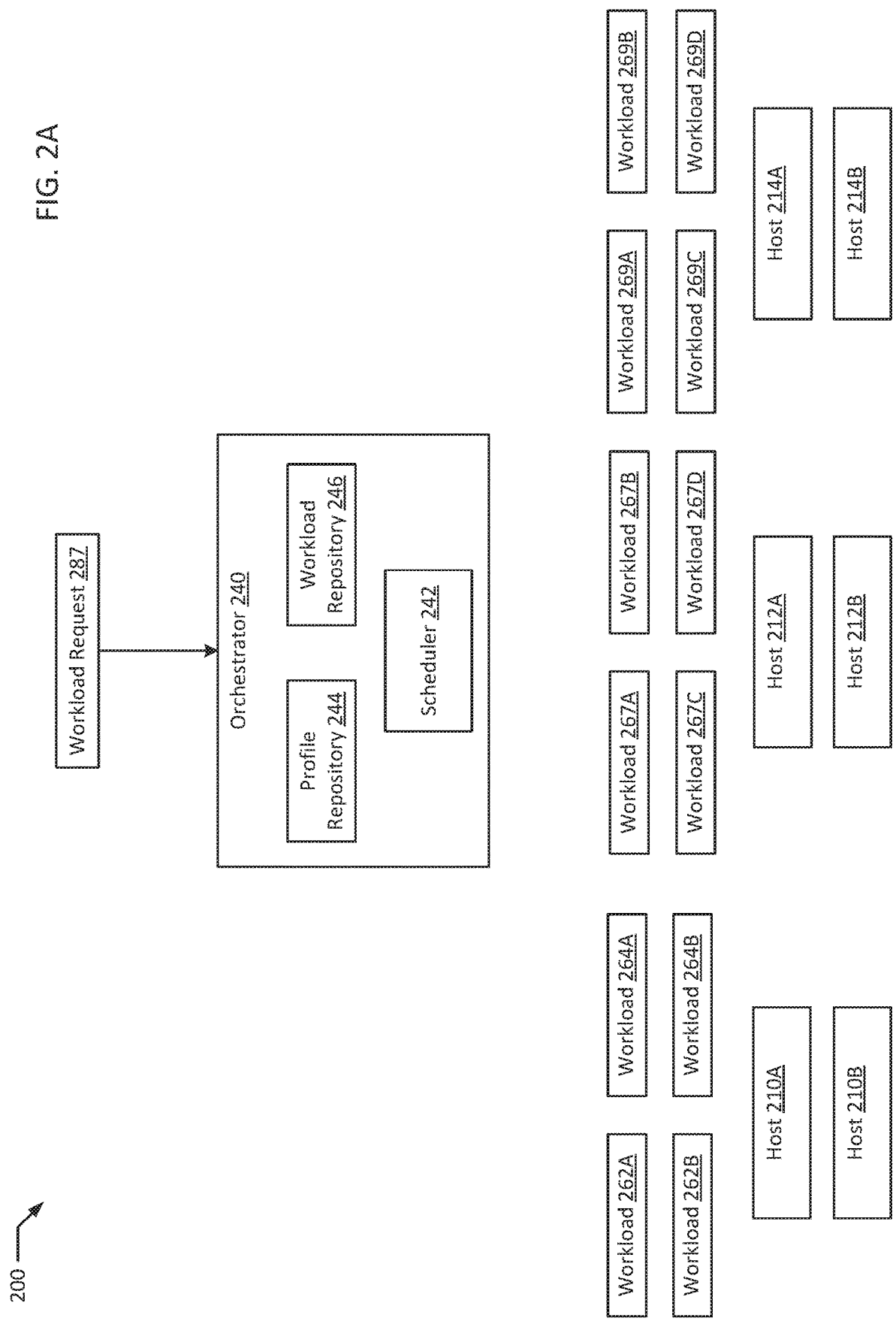
FIGS. 2A-B are block diagrams illustrating orchestrated workload redistribution in a usage instrumented workload scheduling system according to an example of the present disclosure.
Figure 2B:
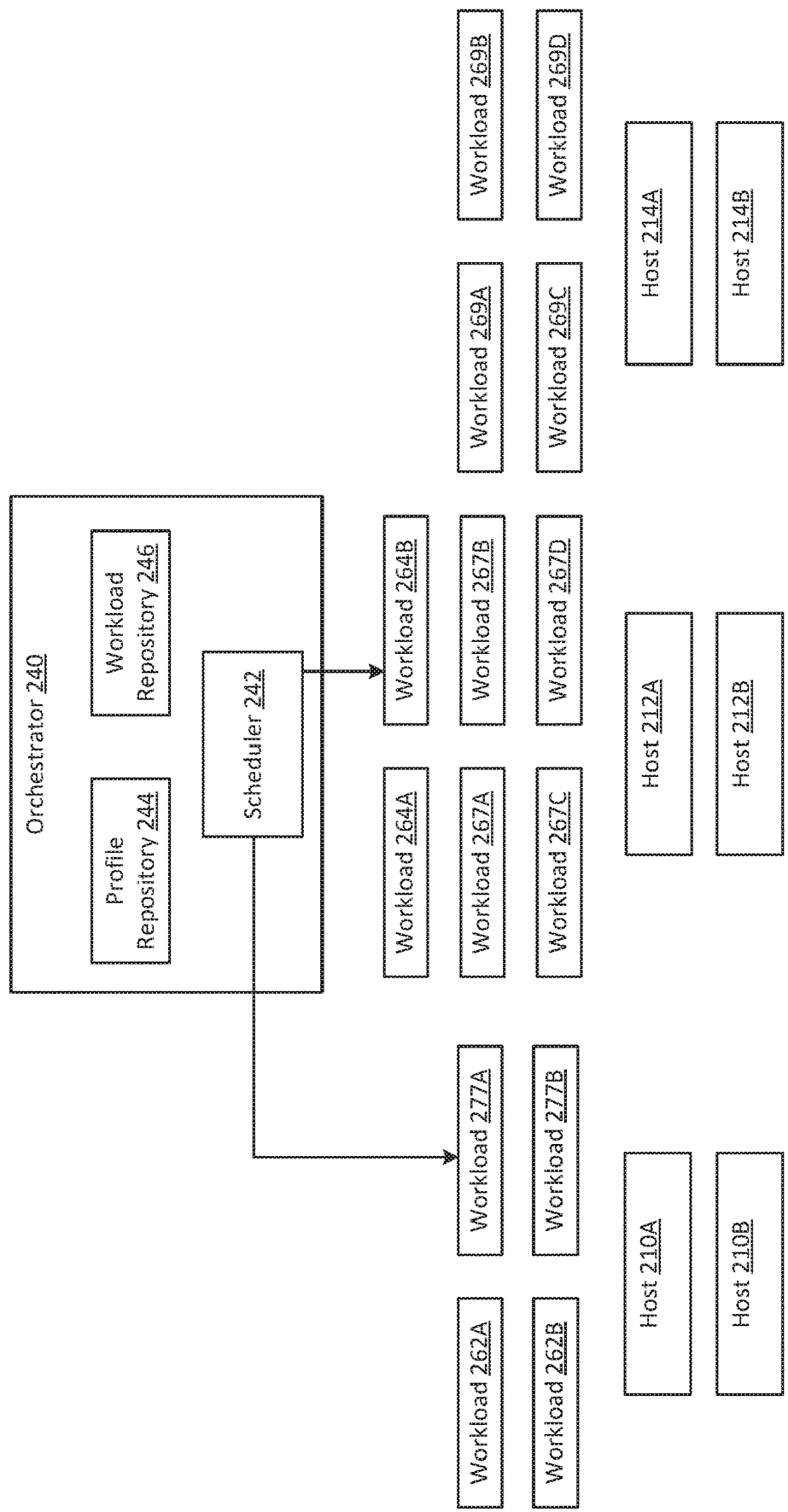

FIGS. 2A-B are block diagrams illustrating orchestrated workload redistribution in a usage instrumented workload scheduling system according to an example of the present disclosure. In an example, system 200 as illustrated in FIG. 2A includes similar hardware components to system 100. In the example, hosts 210A-B, 212A-B, and 214A-B may be physical nodes, VMs, containers, or any other physical or virtual hosting platform on which workloads 262A-B, 264A-B, 267A-D, and 269A-D may execute. In an example, hosts 210A-B may represent a high-priority hosting cluster for high-priority workloads.

In an example, orchestrator 240 may include a profile repository 244 and a workload repository 246. In an example, profile repository 244 and workload repository 246 may be any form of suitable storage system for profile and workload data and/or metadata, for example a relational database. The profile repository 244 and/or workload repository 246 may be stored in a database associated with a database management system ("DBMS"). A DBMS is a software application that facilitates interaction between the database and other components of the system 200. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, a relational database may be implemented with add-on packages and/or services for additional functionality and security (e.g., Red Hat Database®). In an example, profile repository 244 or workload repository 246 may be stored in a database organized as a formal database with a schema such as a relational schema with defined tables, indices, links, triggers, various commands etc. In some examples, profile repository 244 and/or workload repository 246 may not be organized as a formal database, but may instead be an alternative storage structure capable of holding the information stored in profile repository 244 and/or workload repository 246, including but not limited to a file, folder, directory, registry, array, list, etc.

In an example, a workload request 287 is received by orchestrator 240, and may be matched to a profile of a submitting user account and/or workload type in profile repository 244. The workload to be performed based on workload request 287 may be determined, based on the profile data, to be high-priority such that the workload would be hosted on high-priority hosts 210A-B. As depicted in system 201 illustrated in FIG. 2B, hosts 210A-B may be at maximum capacity, for example, based on an overcommit setting for hosts 210A-B. In the example, based on workload repository 246 storing data and/or metadata regarding workloads 264A-B identifying workloads 264A-B as low priority, workloads 264A-B are evicted from hosts 210A-B and transferred to hosts 212A-B. In an example, workloads 264A-B may be workloads from a lower priority account that are of a workload type that benefits from compute resources available on hosts 210A-B not available on hosts 212A-B. In an example, workloads 264A-B may have a longer completion deadline than workloads 277A-B that may also be met by hosts 212A-B, albeit with a longer total execution time. In an example, after one or more evictions, workloads 264A-B may be flagged to no longer be evictable (e.g., from hosts 212A-B to hosts 214A-B).

Figure 3:
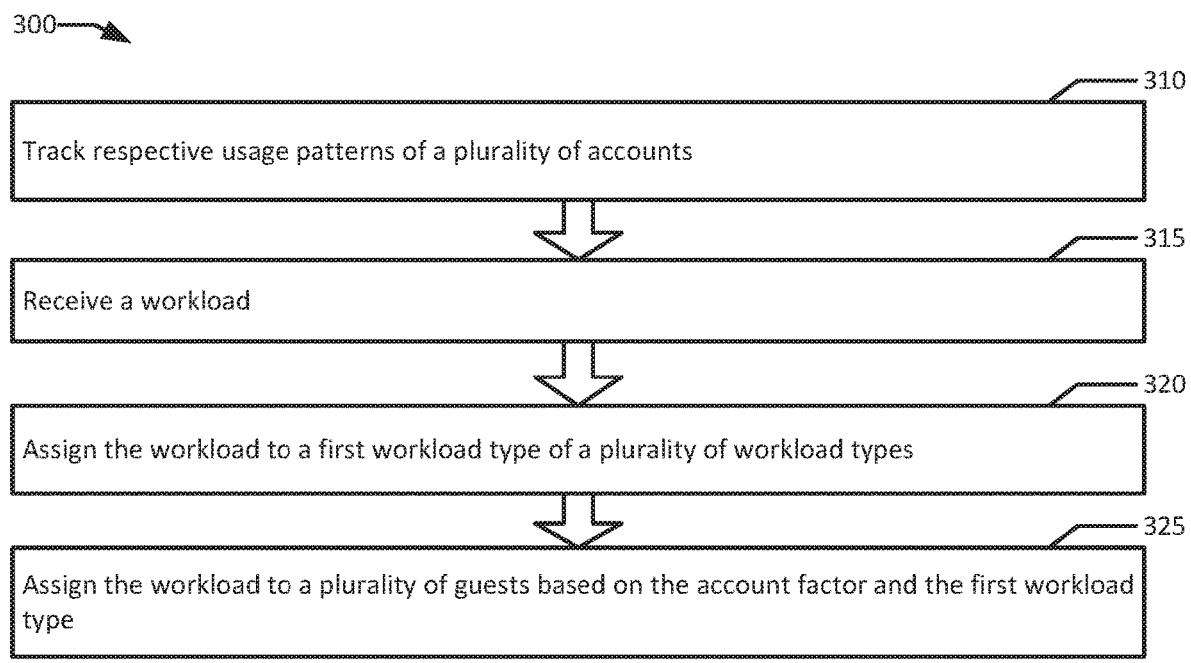
FIG. 3 is a flowchart illustrating an example of usage instrumented workload scheduling according to an example of the present disclosure.

FIG. 3 is a flowchart illustrating an example of usage instrumented workload scheduling according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by an orchestrator 140 including scheduler 142, usage monitor 144, and workload classifier 146.

Example method 300 may begin with tracking respective usage patterns of a plurality of accounts (block 310). In an example, usage monitor 144 tracks usage patterns of many accounts accessing orchestrator 140, including accounts 184 and 189. In an example, usage patterns may be analyzed and converted into account factors that may in turn be inputs in determining how workloads from a given account (e.g., account 184 or 189) should be scheduled for execution. In an example, usage patterns and/or account factors are stored in a profile repository. In an example, usage patterns may include any factors that may aid in determining prioritization information regarding workloads originating from a given account. For example, an account's current login information, whether the account's session is active, whether inputs are being received from the account, how often the account is generating workloads, how often are those workloads being successfully deployed or carried forward into downstream processing, etc. may all be factors in determining whether a user of the account is currently engaged with the system. In many cases, an actively engaged user may expect faster response times than one who is sending in workloads periodically. For example, a user attempting to modify and build a container image file every minute or two is likely waiting for a result, while one who starts a build every hour may be taking a coffee break when initiating build requests. In such an example, the user on the coffee break likely does not mind being deprioritized for the one waiting for a result. If a user only issues a build request once a month, that user probably has no expectations to meet for how fast the build takes.

By taking measurements of an account's interactions with a system, usage monitor 144 may track and update prioritization factors for delivering a positive user experience and a more satisfied tenant. Artificial override factors may also be implemented to, for example, skew prioritization calculations. In an example, an account that is nearing a contractual renewal may be prioritized to encourage renewal, or deprioritized if usage patterns show a likelihood that the user is seeking alternative hosting solutions. In some examples, different classes or tiers of hosting hardware may be available in a multi-tenant cloud. For example, physical hosts 110A-C may have different hardware that provide different levels of compute resources. In an example, a certain level of calculated account based priority, for example aggregated into a priority score, may be required to access certain reserved hosting platforms (e.g., high performance physical host 110A).

A workload is received (block 315). In an example, a first account associated with the workload has an account factor based on the respective usage patterns of the first account. For example, workload request 182 from client node 180 and account 184 may be received by orchestrator 140. Workload request 182 may be a request for workload 172 to be processed. In an example, workload 172 may be executed in a guest (e.g., container 170). In an example, workload 172 maybe a workload to construct a new guest image (e.g., an image for launching workloads 169A-D as containers). In an example, a workload may be any form of processing task handled by system 100. For example, workload 169A may be a container to be hosted for processing other workloads.

In an example, usage monitor 144 creates a behavior based account profile for account 184 based on account 184's interactions with the system. For example, usage monitor 144 may track the frequency of workload submissions from account 184 and the rate of successful completion of the workload submissions. In an example, account 184 may submit workload requests like workload request 182 to build new image files. If a manual request is received (e.g., through command line interface or a graphical user interface), that request source may be tracked. In an example, request patterns may also be indicative of whether an account is under manual control. For example, multiple requests in a short time period (e.g., faster than a human is likely able to input) may be a sign of automated requests. Similarly, requests on standardized timings (e.g., every day at 2 AM) are likely automated requests. By tracking past usage, an expectation score may be calculated for how soon a user of account 184 may expect the completed image file requested by workload request 182. In an example, because usage monitor 144 determines that an user is actively logged in and waiting for results, scheduler 142 is instructed to highly prioritize workload request 182 based on account factors in an account profile of account 184.

In various examples, additional factors may be inputs into account 184's account profile. For example, account 184's account age may be a factor for either positive or negative prioritization. In some cases, a longtime user will have immense inertia to overcome to change platforms, so slightly suboptimal performance may be tolerated. In other cases, keeping longtime users happier for relationship building and brand building may be more important than maximizing compute density and utilization, so longtime users may be prioritized. The proximity in time to a user's contractual renewal dates may also be a factor. In an example, a priority adjustment factor may be additionally applied to another account factor (e.g., whether account age is positive or negative factor for prioritization) or may override calculated priority completely (e.g., force high-priority during a product demonstration). In an example, an account profile for account 184 may factor in at least one of an account age, an account access frequency, an account success frequency, a rate of activity, a presence factor, a request source, and a priority adjustment factor.

In an example, additional inputs may determine whether a given account factor is weighed positively or negatively. For example, account or workload success frequency may under different circumstances be a positive or negative prioritization factor. In many cases, a frequently successful user is likely a happier user, and successful workloads are generally successful, useful uses of compute capacity. For an unsuccessful user, the types of failures the user experiences may indicate whether increasing prioritization or decreasing prioritization is likely to result in a net hardware utilization increase. In an example, an account that frequently triggers timeout errors may waste a lot of processing time and such requests may take significantly longer to produce than a successful result. In such cases, high performance hardware is likely wasted because any latency gains will likely be orders of magnitude less than time spent waiting for a request to time out. However, an active programmer who continuously submits workload builds with minor changes during a debugging process may trigger many quick failures while actively waiting for error codes as feedback, and should therefore be prioritized. In an example, an account success frequency metric includes a build success measurement, a deployment success measurement, and/or a network traffic measurement. For example, workload 172 may successfully create a new image file to launch workloads 169A-D and be recorded as a success in a build success measurement. Workloads 169A-D may successfully launch on VM 116 and be recorded as successes for a deployment success measurement. When workloads 160A-D start receiving requests and sending results, the successful processing of requests and/or the network load handled by workloads 169A-D may be recorded in a network traffic measurement.

Under most circumstances, an active user logged in may be prioritized over automated systems. However, in the case of a workload (e.g., workload 160A-D) that is, for example, a web server serving a webpage, if an automated process triggers a request for an additional instance of the workload to be launched to handle high traffic volumes, such a request may be maximally prioritized to avoid potential load based failures or crashes. In some cases, additional workload and/or result metrics may be stored with an account profile. For example, if account 184's workloads (e.g., workload 172) generally result in compressible or deduplicable results, workload 172 may be preferentially assigned storage (e.g., guest memory 195A) where such efficiency features are available. Similarly, historical workloads submitted by account 184 may indicate whether the availability of specialized hardware (e.g., GPUs, extra floating point registers, etc.) may benefit workload 172. In an example, multiple account factors may be combined into an account priority score.

The workload is assigned to a first workload type of a plurality of workload types (block 320). In an example, workload request 182 is received by a workload classifier 146, which, based on analyzing workload request 182, determines a preconfigured categorization or workload type of workload 172. For example, a request to build a new image file vs. a request to host a new guest, vs. a request for a guest to handle data processing. In an example, workload request 182 may include data, for example in the form of metadata, that aids in the categorization of workload 172. In an example, workload classifier 146 additionally includes compute resource requirements gathering for workload classification. In an example, each preconfigured workload type includes compute resource requirements. In an example, a high-priority account (e.g., account 184) sending in a workload request 182, may allow workload request 182 to be prioritized in the workload classification process. For example, if workload classifier 146 has a queue of workload requests to classify, workload request 182 may be advanced in the queue ahead of a workload request from a lower priority request.

In an example, two different preconfigured workload types may have the same or similar compute resource requirements, but may instead differ based on an urgency or timing factor. In an example, two workload types may both benefit from extra CPU speed available on high performance physical host 110A. However, one may be slotted for immediate execution while another may be slotted for overnight execution on physical host 110A based on when results are expected. In the example, the first workload type includes a first target completion time shorter than a second target completion time of the second workload type. In an example, a given workload type may execute on multiple different grades of hosting environments, and may execute differently depending on the hosting environment employed. For example, a workload on physical host 110B (e.g., workloads 167A-D) may be limited to using one CPU core on CPU 120C at any given time. In comparison, the same workload if executing on physical host 110A may also be limited to one core of CPU 120A, but may additionally during bursts of peak usage have additional CPU time allocated from a core of CPU 120B allowing for additional parallel processing and performance. In an example, an overall workload priority score may be calculated from an account priority score and the workload type of a workload (e.g., workload 172). In the example, the workload priority score may be used by scheduler 142 in determining where to schedule execution of workload 172. In an example, a high-priority account may have a low priority workload, while a low priority account may have a high-priority workload based on the combination of factors in the workload priority score. In an example, physical hardware constraints may dictate where a given workload is scheduled.

The workload is assigned to a plurality of guests based on the account factor and the first workload type (block 325). In an example, scheduler 142 factors in outputs of usage monitor 144 and workload classifier 146 to schedule workload 172 to container 170 based on workload 182. In an example, workload 172 benefits from multiple processor cores being available, and is therefore assigned to high performance physical host 110A over other hosting environments (e.g., physical hosts 110B-C). In an example, physical host 110A includes at least one compute resource with higher performance than physical host 110B (e.g., CPU 120A is faster than CPU 120C). In an example, variations in compute resource between physical hosts 110A and 110B may include processor speed, processor count, graphical processor speed, graphical processor count, memory size, memory bandwidth, storage type, storage size, storage bandwidth, network bandwidth, network latency, and overcommit buffer. In an example, physical host 110B may have the same physical hardware as physical host 110A, but may programmatically limit the amount of a given compute resource available to a given workload.

In an example, in addition to physical hardware prioritization, where beneficial, a workload may be prioritized in software and routing as well. For example, a high-priority workload may be labeled with handling priority in network switch queues, may have access to reserved or lower latency application programming interfaces, may be advanced in queues requesting persistent storage, etc. In an example, a workload request to launch a new guest (e.g., workloads 169A-D) may be prioritized in a queue for retrieving an image file from an image file repository. In an example, where a higher priority workload request is received requiring execution on a high performance node (e.g., physical host 110A), a lower priority workload executing on that host may be evicted (e.g., via termination) from the host. In some examples, the evicted workload may be migrated to another node (e.g., physical hosts 110B-C). In other examples, the evicted workload may be restarted at a later time.

In an example, an account factor or account profile of account 184 may be associated with a workload (e.g., workload 172). For example, a link may be established and recorded between account 184's account profile and workload 172 in a workload repository. In an example, workload 172's workload type may be associated with workload 172 and recorded. In an example, by associating and cross referencing data for where given workloads are executing to the profile and workload type data associated with a given workload, scheduler 142 may readily access such data to determine a workload to evict from a hosting environment where necessary.

Figure 4:
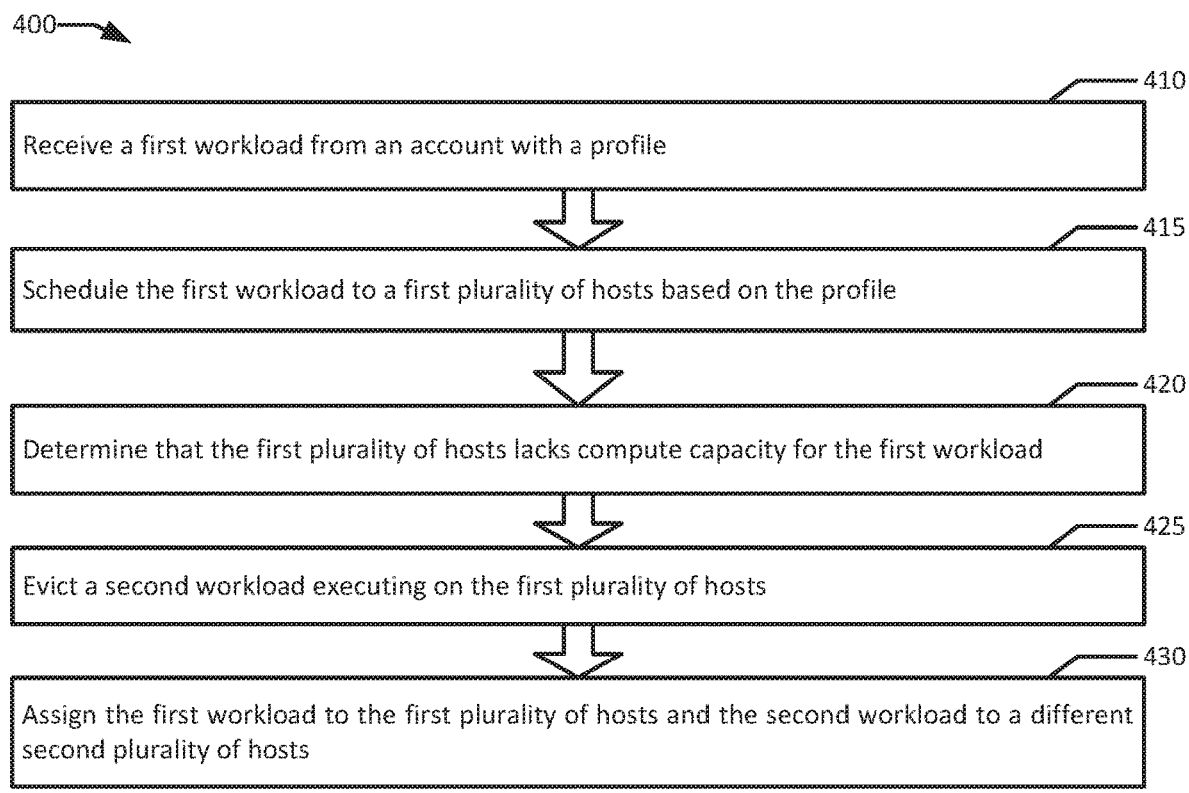
FIG. 4 is a flowchart illustrating an example of orchestrated workload redistribution with usage instrumented workload scheduling according to an example of the present disclosure.

FIG. 4 is a flowchart illustrating an example of orchestrated workload redistribution with usage instrumented workload scheduling according to an example of the present disclosure. Although the example method 300 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by an orchestrator 240 including scheduler 242, profile repository 244, and workload repository 246.

Example method 400 may begin with receiving a first workload from an account with a profile in a profile repository (block 410). In an example, workload request 287 is received from an account with an associated profile in profile repository 244. For example, a user profile may be compiled from usage metrics gathered by a usage monitor similar to usage monitor 144 above. In an example, profile repository 244 includes separate profiles associated with each of the accounts with access to scheduling workloads on system 200. In an example, profile repository 244 may have subentries for sub accounts of a given overarching account. For example, where system 200 is a multi-tenant cloud, primary accounts may be created for the tenants of the cloud environment, with secondary prioritization profiles for users of the tenants. In an example, commonly requested workload characteristics or workload types may be additionally stored in profile repository 244, thereby allowing expedited workload identification, classification, and prioritization. In an example, an account profile includes an account age, an account access frequency, an account success frequency, a rate of activity, a presence factor, a request source, and/or a priority adjustment factor. In an example, a profile includes historical compute resource consumption measurements of an account and/or workload, workload request, or workload type. In an example, a profile includes at least one of a build success measurement, a deployment success measurement, and a network traffic measurement.

The first workload is scheduled to a first plurality of hosts based on the profile (block 415). In an example, based on profile data from profile repository 244, workload request 287's associated workload requires high performance hosting (e.g., hosts 210A-B). In an example, hosts 210A-B provide a compute resource with higher performance than is available on hosts 212A-B or 214A-B. In an example, the higher performance compute resources on hosts 210A-B include processor speed, processor count, graphical processor speed, graphical processor count, memory size, memory bandwidth, storage type, storage size, storage bandwidth, network bandwidth, network latency, and/or overcommit buffer.

The first plurality of hosts is determined to lack compute capacity for the first workload (block 420). In an example, based on workload repository 246, in which currently executing workloads (e.g., workloads 262A-B, 264A-B, 267A-D, and 269A-B) on each hosting environment (e.g., hosts 210A-B, hosts 212 A-B, or hosts 214A-B) are recorded. In an example, orchestrator 240 determines that all of the available compute capacity in high performance hosting cluster hosts 210A-B is currently occupied, for example, based on workload repository 246. In the example, there may be physical computing capacity available on hosts 210A-B, but, for example, a limitation on overcommitting resources configured on hosts 210A-B prevents additional workloads from being deployed to hosts 210A-B.

A second workload executing on the first plurality of hosts is evicted based on a workload repository (block 425). In an example, each workload entry in workload repository 246 may be further associated with a prioritization score and/or an evictability factor of the workload. In an example, workloads 264A-B are determined to be lower priority than workloads 277A-B requested by workload request 287. In another example, workloads 264A-B are of similar or higher priority than workloads 277A-B, however, workloads 264A-B do not require any compute resource available to hosts 210A-B but not available to hosts 212A-B. In an example, workloads 264A-B have a completion deadline that allows for eviction and migration or restarting. In an example, entries in workload repository 246 include identifiers for each of workloads 262A-B, 264A-B, 267A-D, and 269A-B. In an example, entries in workload repository 246 may be associated with a relevant prioritization score and/or be associated with a profile in profile repository 244.

The first workload is assigned to the first plurality of hosts and the second workload is assigned to a different second plurality of hosts (block 430). In an example, scheduler 242 evicts workloads 264A-B from hosts 210A-B and reassigns them to hosts 212A-B to make room for assigning workloads 277A-B to hosts 210A-B. In an example, after one or more evictions, workloads 264A-B are flagged in workload repository 246 to prevent further evictions.

Figure 5:
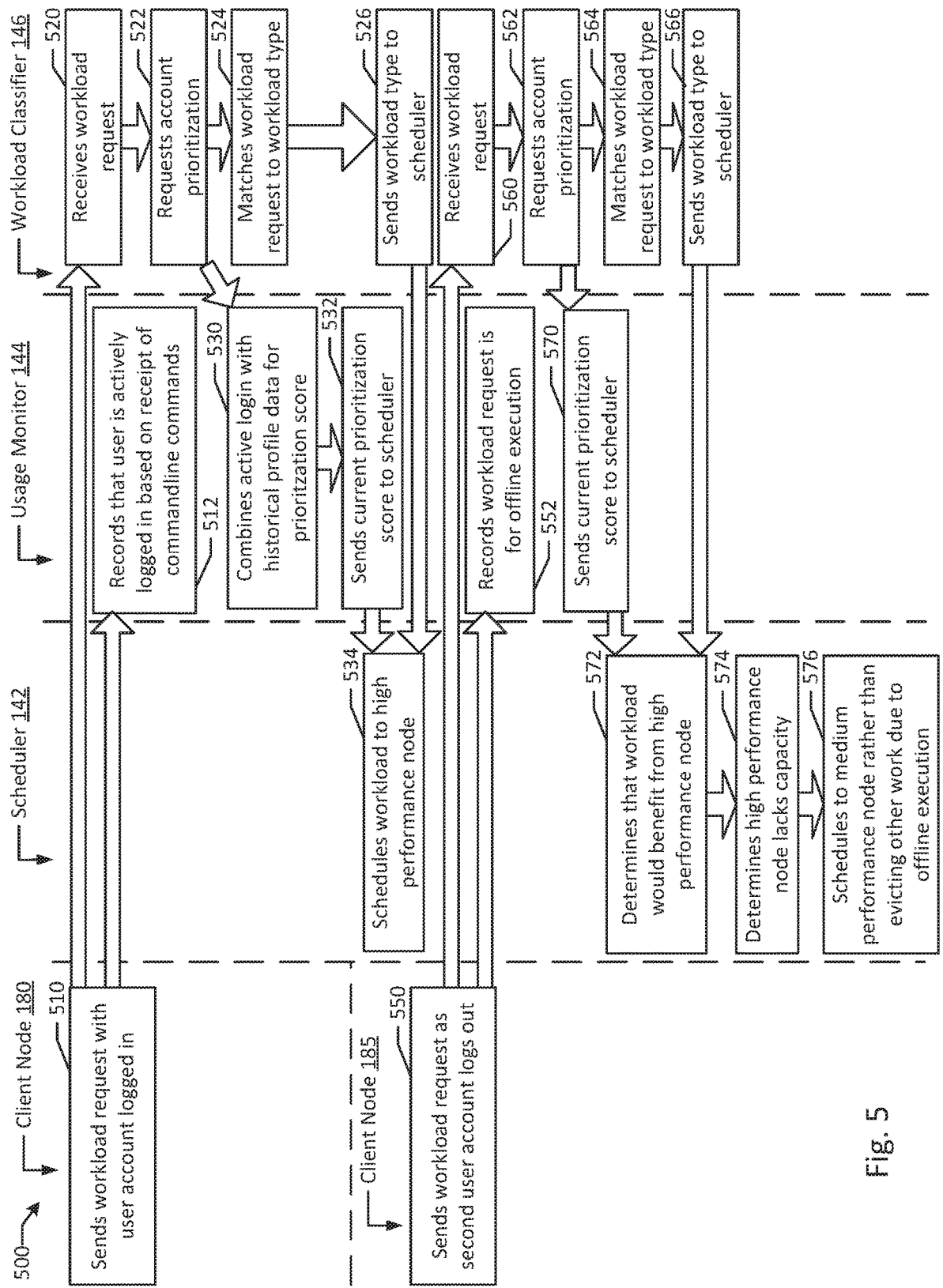
FIG. 5 is flow diagram of an example of usage instrumented workload scheduling according to an example of the present disclosure.

FIG. 5 is flow diagram of an example of usage instrumented workload scheduling according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, scheduler 142, usage monitor 144, and workload classifier 146 scheduler a workload from client node 180.

In example system 500, client node 180 with user account 184 logged in sends a workload request 182 to orchestrator 140 (block 510). In an example, usage monitor 144 records that a user is actively logged into account 184 when the workload request 182 is received based on the user entering command line commands into a terminal (block 512). In an example, workload classifier 146 receives the workload request 182 (block 520). Workload classifier 146 may then request account prioritization data for account 184 to be retrieved (block 522). In various examples, other triggers may cause account prioritization data to be retrieved, for example, a load balancer service that routes a workload request 182 to workload classifier 146 as well as to a profile repository and/or usage monitor 144. In an example, workload classifier 146 matches the workload requested by account 184 to a workload type that benefits from multiple processors being available (block 524). In an example, workload classifier 146 sends the workload type to scheduler 142 (block 526).

In an example, usage monitor 144 receives a request for account prioritization data for account 184, and combines the information that account 184 has a user actively logged in with historical profile data (e.g., from a prioritization repository) to create a current prioritization score for account 184 (block 530). In an example, usage monitor 144 sends the current prioritization score to scheduler 142 (block 532). In an example, scheduler 142 schedules workload 172 to high performance hosting node physical host 110A (block 534). In the example, the combination of a waiting user and high performance workload type grants workload 172 extra high priority.

In an example, while workload 172 is executing on container 170 of high performance hosting node physical host 110A, client node 185 sends a workload request 187 from account 189, but the user of account 189 logs off after confirming the workload request 187 is sent (block 550). In an example, usage monitor 144 records that the new workload request 187 is made for offline execution (block 552). In an example, workload classifier 146 receives the new workload request 187 (block 560). Workload classifier 146 may then request account prioritization data for account 189 to be retrieved (block 562). In an example, workload classifier 146 matches the workload requested by account 189 to a workload type that benefits from multiple processors being available (block 564). In an example, workload classifier 146 sends the workload type to scheduler 142 (block 566).

In an example, usage monitor 144 calculates a current prioritization score for account 189 including factoring in that account 189 is logged off and therefore not immediately expecting results. In the example, this current prioritization score is sent to scheduler 142 (block 570). Upon receiving the prioritization score and workload type, scheduler 142 determines that the workload requested by account 189 would also benefit from being executed on high performance node physical host 110A (block 572). However, scheduler 142 determines that the high performance node lacks capacity to execute account 189's requested workload (block 574). In the example, scheduler 142 schedules workloads 167A-D requested by account 189 to containers 165A-D of medium performance hosting node physical host 110B. In the example, due to no expectation of fast results, scheduling workloads 167A-D to physical host 110B is less disruptive than evicting any workloads from physical host 110A (block 576).

Figure 6:
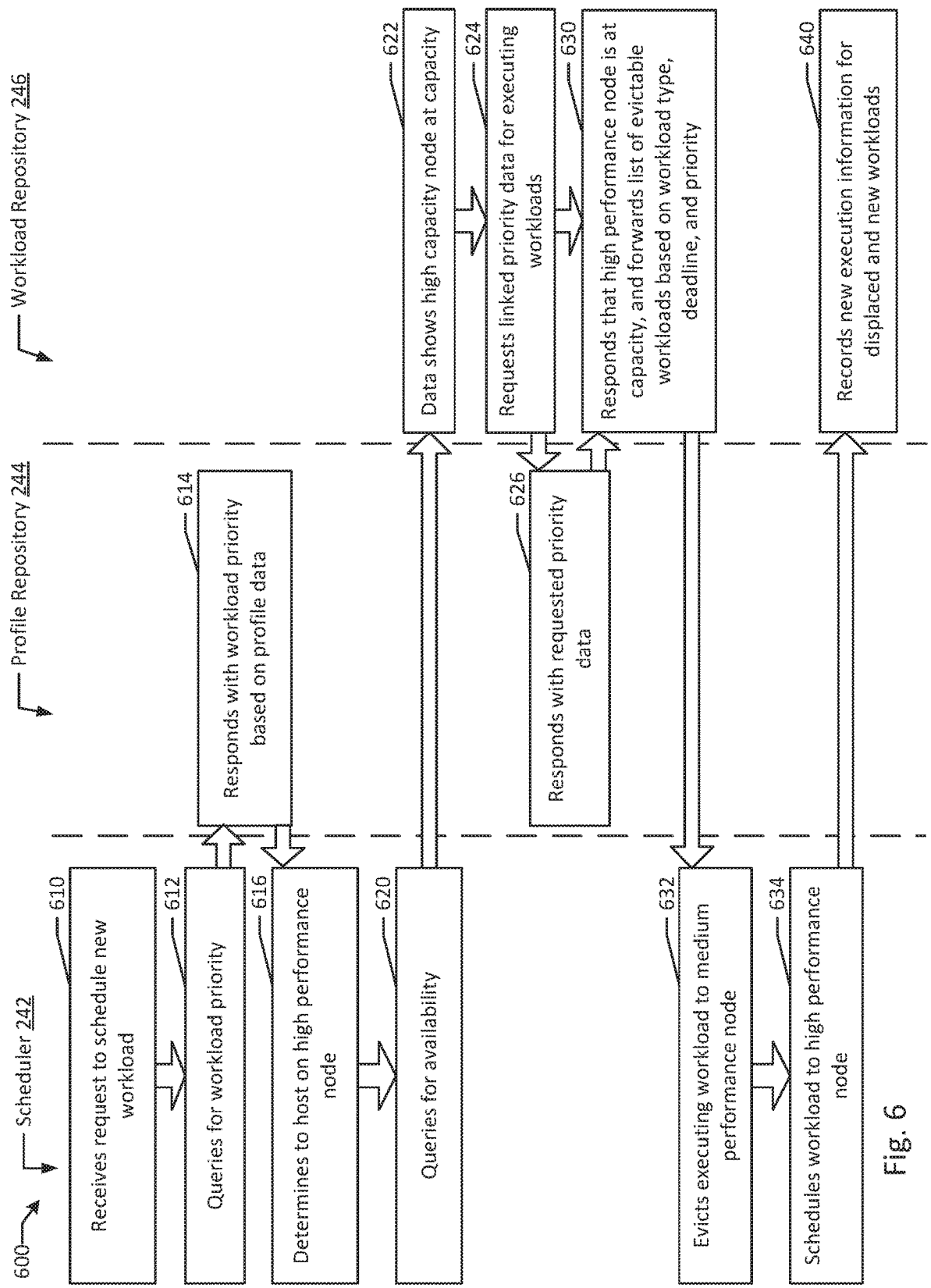
FIG. 6 is flow diagram of an example of orchestrated workload redistribution with usage instrumented workload scheduling according to an example of the present disclosure.

FIG. 6 is flow diagram of an example of orchestrated workload redistribution with usage instrumented workload scheduling according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, scheduler 242, profile repository 244, and workload repository 246 redistribute workload based on usage instrumented workload scheduling.

In example system 600, scheduler 142 receives workload request 287 to schedule a new workload (block 610). In the example, scheduler 142 queries profile repository 244 for workload priority for workload request 287 (block 612). In an example, profile repository includes historical usage data for an account associated with workload request 287 as well as a workload type of workload request 287 that includes compute capacity requirements of workload request 287. In the example, profile repository 244 responds to scheduler 242 with workload priority data based on the stored profile data (block 614). Based on the profile data received, scheduler 242 determines that workloads 277A-B requested in workload request 287 require hosting on a high performance node (e.g., hosts 210A-B) (block 616). In an example, scheduler 242 queries workload repository 246 for capacity availability of hosts 210A-B (block 620).

In the example, workload repository 246 shows that hosts 210A-B are already operating at capacity based on hosting workloads 262A-B and 264A-B (block 622). Workload repository 246 then requests prioritization data for workloads 262A-B and 264A-B (block 624). In some examples, prioritization data for workloads 262A-B and 264A-B or an indicator thereof may be stored with hosting and/or execution data in workload repository 246. In an example, profile repository 244 responds with priority data for workloads 262A-B and 264A-B (block 626). Workload repository 246 then responds to scheduler 242 that the high performance node (e.g., hosts 210A-B) is at maximum capacity, and forwards a list of evictable workloads from hosts 210A-B based on workload type, execution deadline, and prioritization data (block 630). In an example, workloads 264A-B are identified as evictable.

Upon receiving the evictable workload list, scheduler 242 may evict workloads 265A-B from hosts 210A-B and transfer them to hosts 212 A-B (e.g., a medium performance node) (block 632). In an example, scheduler 242 schedules workloads 277A-B to hosts 212 A-B after capacity is created (block 634). In an example, workload repository 246 records the new execution locations of workloads 264A-B and 277 A-B (block 640).

Figure 7:
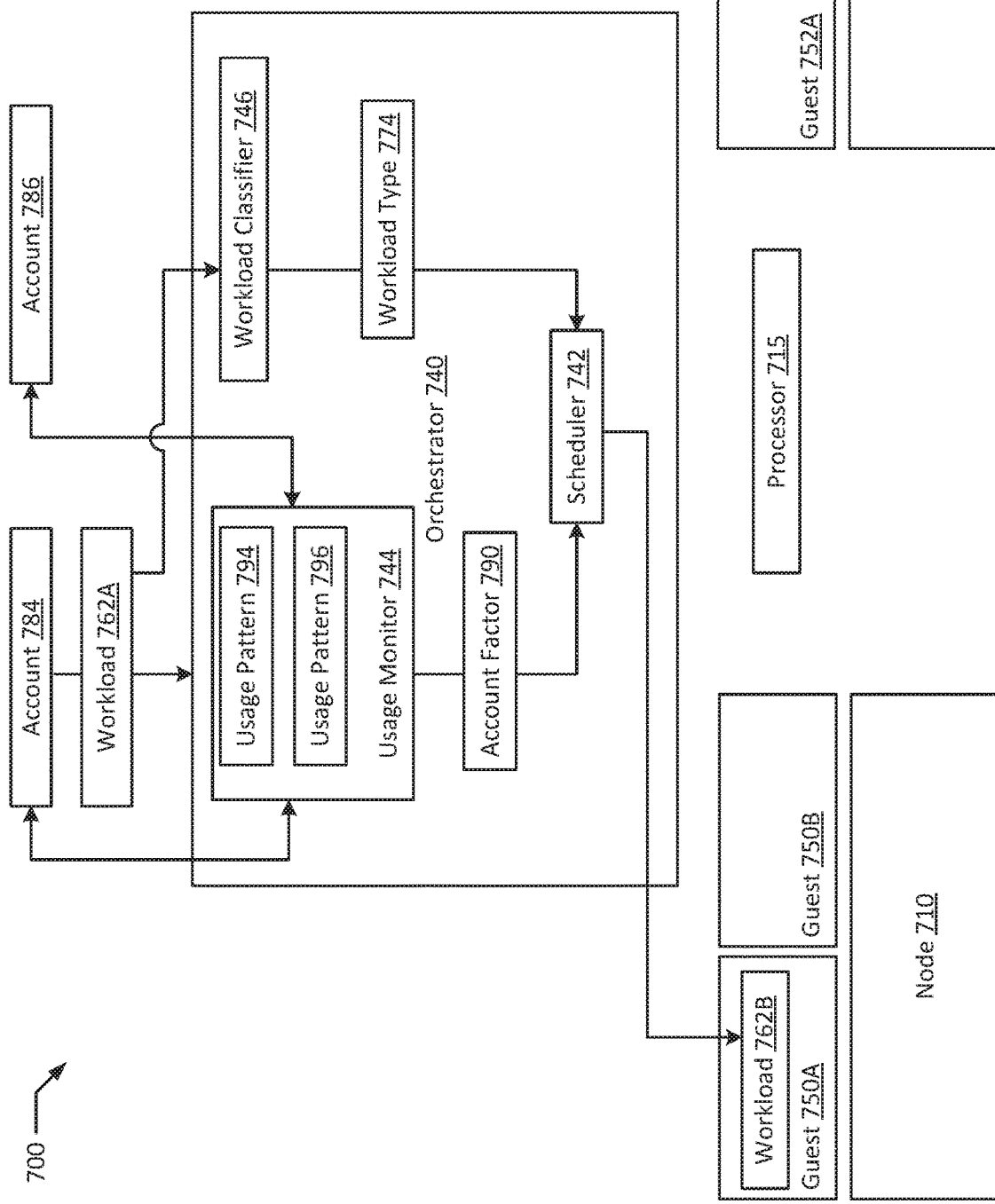
FIG. 7 is a block diagram of an example usage instrumented workload scheduling system according to an example of the present disclosure.

FIG. 7 is a block diagram of an example usage instrumented workload scheduling system according to an example of the present disclosure. Example system 700 includes nodes 710 and 712 hosting guests 750A-B and 752A-B. Orchestrator 740 including usage monitor 744, workload classifier 746, and scheduler 742 execute on processor 715. Usage monitor 744 tracks usage patterns 794 and 796 of respective accounts 784 and 786. Workload 762A is received from account 784, which has an account factor 790 based on usage pattern 794 of account 784. Workload 762A is assigned to workload type 774 by workload classifier 746. Scheduler 742 assigns workload 762A to guests 750A-B as workload 762B based on account factor 790 and workload type 774.

Figure 8:
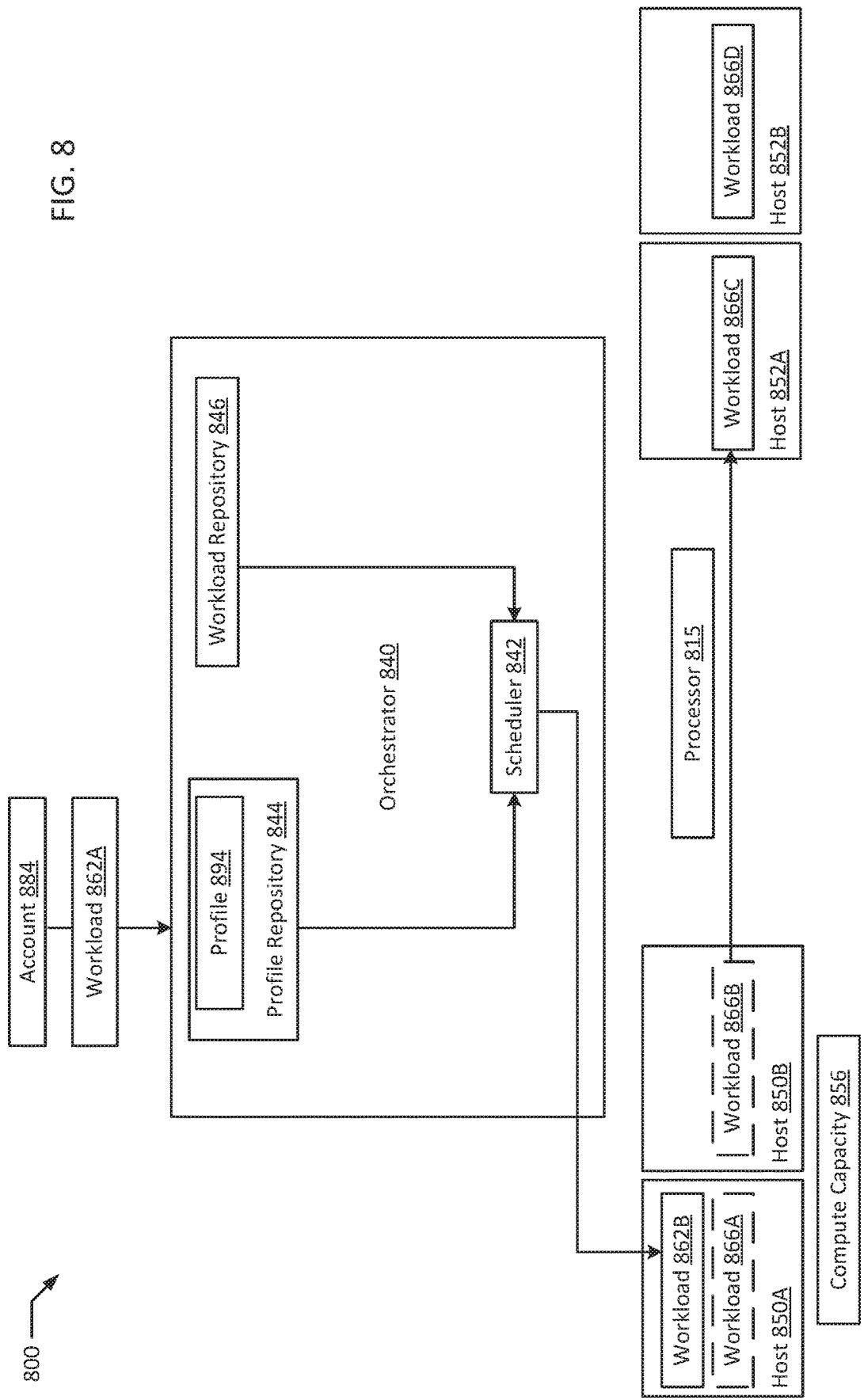
FIG. 8 is a block diagram of an example of orchestrated workload redistribution by a usage instrumented workload scheduling system according to an example of the present disclosure.

FIG. 8 is a block diagram of an example of orchestrated workload redistribution by a usage instrumented workload scheduling system according to an example of the present disclosure. Example system 800 includes hosts 850A-B and different hosts 852A-B. Orchestrator 840, including profile repository 844, workload repository 846, and scheduler 842 executes on processor 815. Workload 862A is received from account 884 with profile 894 in profile repository 844. Workload 862A is scheduled to hosts 850A-B based on profile 894. Hosts 850A-B are determined to lack compute capacity 856 for workload 862A. Workloads 866A-B executing on hosts 850A-B are evicted based on workload repository 846. Scheduler 842 assigns workload 862A to hosts 850A-B as workload 862B, and workloads 866A-B to hosts 852A-B as workloads 866C-D.

Usage instrumented workload scheduling as presently disclosed enables higher compute density on multi-tenant clouds by adding objective, quantifiable, measureable factors into workload prioritization and scheduling. By tracking past usage on both an account and workload level, scheduling of workloads may be performed on a more granular basis. In addition, by classifying workloads into different workload types, hardware nodes may be more fully utilized between the various compute resources available on the hardware nodes. For example, a node reaching capacity for CPU overcommit may actually have significant amounts of remaining capacity for memory usage. In such cases, that hosting node may be a high performance node for certain workloads that require memory performance but not high amounts of CPU load. Therefore, more workloads at each level of priority may be scheduled simultaneously on the same hardware, increasing hardware utilization and overall computing capacity of a cloud hosting system. In addition, by deferring workloads of less urgency to less busy times, idle time is reduced resulting in higher overall usage of the system.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a plurality of nodes hosting at least a first plurality of guests and a second plurality of guests; an orchestrator including a usage monitor, a workload classifier, and a scheduler executing on one or more processors to: track, by the usage monitor, respective usage patterns of a plurality of accounts including a first account; receive, from the first account, a first workload, wherein the first account has a first account factor based on the respective usage patterns of the first account; assign, by the workload classifier, the first workload to a first workload type of a plurality of workload types; and assign, by the scheduler, the first workload to the first plurality of guests based on the first account factor and the first workload type.

In accordance with a 2nd exemplary aspect of the present disclosure, which may be used in combination with any one or more of the preceding aspects (e.g., the 1st aspect), wherein the usage monitor stores a plurality of account factors including the first account factor in a profile repository. In accordance with a 3rd exemplary aspect of the present disclosure, which may be used in combination with any one or more of the preceding aspects (e.g., the 1st aspect), wherein a compute resource with higher performance is available to guests of the first plurality of guests than to guests of the second plurality of guests. In accordance with a 4th exemplary aspect of the present disclosure, which may be used in combination with any one or more of the preceding aspects (e.g., the 3rd aspect), wherein the compute resource is one of processor speed, processor count, graphical processor speed, graphical processor count, memory size, memory bandwidth, storage type, storage size, storage bandwidth, network bandwidth, network latency, and overcommit buffer.

In accordance with a 5th exemplary aspect of the present disclosure, which may be used in combination with any one or more of the preceding aspects (e.g., the 1st aspect), wherein at least one compute resource used by the first workload is programmatically limited. In accordance with a 6th exemplary aspect of the present disclosure, which may be used in combination with any one or more of the preceding aspects (e.g., the 1st aspect), wherein the first account factor includes at least one of an account age, an account access frequency, an account success frequency, a rate of activity, a presence factor, a request source, and a priority adjustment factor. In accordance with a 7th exemplary aspect of the present disclosure, which may be used in combination with any one or more of the preceding aspects (e.g., the 6th aspect), wherein the account success frequency includes at least one of a build success measurement, a deployment success measurement, and a network traffic measurement. In accordance with a 8th exemplary aspect of the present disclosure, which may be used in combination with any one or more of the preceding aspects (e.g., the 6th aspect), wherein the first account factor and a second account factor are combined into an account priority score.

In accordance with a 9th exemplary aspect of the present disclosure, which may be used in combination with any one or more of the preceding aspects (e.g., the 1st aspect), wherein each workload type of the plurality of workload types includes compute resource requirements. In accordance with a 10th exemplary aspect of the present disclosure, which may be used in combination with any one or more of the preceding aspects (e.g., the 1st aspect), wherein the first workload type and a second workload type have the same compute resource requirements and the first workload type includes a first target completion time shorter than a second target completion time of the second workload type. In accordance with an 11th exemplary aspect of the present disclosure, which may be used in combination with any one or more of the preceding aspects (e.g., the 1st aspect), wherein a workload priority score is based on an account priority score and the first workload type. In accordance with a 12th exemplary aspect of the present disclosure, which may be used in combination with any one or more of the preceding aspects (e.g., the 1st aspect), wherein a second workload is terminated on the first plurality of guests in response to the first workload being assigned to the first plurality of guests. In accordance with a 13th exemplary aspect of the present disclosure, which may be used in combination with any one or more of the preceding aspects (e.g., the 1st aspect), wherein the first workload is prioritized over a second workload in a workload queue.

Aspects of the subject matter described herein may be useful alone or in combination with one or more other aspects described herein. In a 1st exemplary aspect of the present disclosure, a method comprises: tracking respective usage patterns of a plurality of accounts including a first account; receiving a first workload, wherein the first account has a first account factor based on the respective usage patterns of the first account; assigning the first workload to a first workload type of a plurality of workload types; and assigning the first workload to a first plurality of guests based on the first account factor and the first workload type.

In accordance with a 15th exemplary aspect of the present disclosure, which may be used in combination with any one or more of the preceding aspects (e.g., the 14th aspect), wherein a plurality of account factors including the first account factor are stored in a profile repository. In accordance with a 16th exemplary aspect of the present disclosure, which may be used in combination with any one or more of the preceding aspects (e.g., the 14th aspect), wherein a compute resource with higher performance is available to guests of the first plurality of guests than to guests of a second plurality of guests. In accordance with a 17th exemplary aspect of the present disclosure, which may be used in combination with any one or more of the preceding aspects (e.g., the 16th aspect), wherein the compute resource is one of processor speed, processor count, graphical processor speed, graphical processor count, memory size, memory bandwidth, storage type, storage size, storage bandwidth, network bandwidth, network latency, and overcommit buffer.

In accordance with a 18th exemplary aspect of the present disclosure, which may be used in combination with any one or more of the preceding aspects (e.g., the 14th aspect), wherein at least one compute resource used by the first workload is programmatically limited. In accordance with a 19th exemplary aspect of the present disclosure, which may be used in combination with any one or more of the preceding aspects (e.g., the 14th aspect), wherein the first account factor includes at least one of an account age, an account access frequency, an account success frequency, a rate of activity, a presence factor, a request source, and a priority adjustment factor. In accordance with a 20th exemplary aspect of the present disclosure, which may be used in combination with any one or more of the preceding aspects (e.g., the 19th aspect), wherein the account success frequency includes at least one of a build success measurement, a deployment success measurement, and a network traffic measurement. In accordance with a 21st exemplary aspect of the present disclosure, which may be used in combination with any one or more of the preceding aspects (e.g., the 19th aspect), wherein the first account factor and a second account factor are combined into an account priority score.

In accordance with a 22nd exemplary aspect of the present disclosure, which may be used in combination with any one or more of the preceding aspects (e.g., the 14th aspect), wherein each workload type of the plurality of workload types includes compute resource requirements. In accordance with a 23rd exemplary aspect of the present disclosure, which may be used in combination with any one or more of the preceding aspects (e.g., the 14th aspect), wherein the first workload type and a second workload type have the same compute resource requirements and the first workload type includes a first target completion time shorter than a second target completion time of the second workload type. In accordance with a 24th exemplary aspect of the present disclosure, which may be used in combination with any one or more of the preceding aspects (e.g., the 14th aspect), wherein a workload priority score is based on an account priority score and the first workload type. In accordance with a 25th exemplary aspect of the present disclosure, which may be used in combination with any one or more of the preceding aspects (e.g., the 14th aspect), wherein a second workload is terminated on the first plurality of guests in response to the first workload being assigned to the first plurality of guests. In accordance with a 26th exemplary aspect of the present disclosure, which may be used in combination with any one or more of the preceding aspects (e.g., the 14th aspect), wherein the first workload is prioritized over a second workload in a workload queue.

Aspects of the subject matter described herein may be useful alone or in combination with one or more other aspects described herein. In a 27th exemplary aspect of the present disclosure, a computer-readable non-transitory storage medium storing executable instructions, which when executed by a computer system, cause the computer system to: track respective usage patterns of a plurality of accounts including a first account; receive a workload, wherein the first account has an account factor based on the respective usage patterns of the first account; assign the workload to a first workload type of a plurality of workload types; and assign the workload to a plurality of guests based on the account factor and the first workload type.

Aspects of the subject matter described herein may be useful alone or in combination with one or more other aspects described herein. In a 28th exemplary aspect of the present disclosure, a system comprises: a means for tracking respective usage patterns of a plurality of accounts including a first account; a means for receiving a workload, wherein the first account has an account factor based on the respective usage patterns of the first account; a means for assigning the workload to a first workload type of a plurality of workload types; and a means for assigning the workload to a plurality of guests based on the first account factor and the first workload type.

Aspects of the subject matter described herein may be useful alone or in combination with one or more other aspects described herein. In a 29th exemplary aspect of the present disclosure, a system comprises: a first plurality of hosts and a different second plurality of hosts; an orchestrator including a profile repository, a workload repository, and a scheduler executing on one or more processors to: receive a first workload from a first account with a first profile in the profile repository; schedule the first workload to the first plurality of hosts based on the first profile; determine that the first plurality of hosts lacks compute capacity for the first workload; evict, based on the workload repository, a second workload executing on the first plurality of hosts; and assign, by the scheduler, the first workload to the first plurality of hosts and the second workload to the second plurality of hosts.

In accordance with a 30th exemplary aspect of the present disclosure, which may be used in combination with any one or more of the preceding aspects (e.g., the 29th aspect), wherein the profile repository includes a plurality of profiles including the first profile, and each profile of the plurality of profiles is associated with a respective account. In accordance with a 31st exemplary aspect of the present disclosure, which may be used in combination with any one or more of the preceding aspects (e.g., the 29th aspect), wherein the first profile includes at least one of an account age, an account access frequency, an account success frequency, a rate of activity, a presence factor, a request source, and a priority adjustment factor. In accordance with a 32nd exemplary aspect of the present disclosure, which may be used in combination with any one or more of the preceding aspects (e.g., the 31st aspect), wherein the first profile includes historical compute resource consumption measurements of at least one of a first account and the first workload. In accordance with a 33rd exemplary aspect of the present disclosure, which may be used in combination with any one or more of the preceding aspects (e.g., the 31st aspect), wherein the first profile includes at least one of a build success measurement, a deployment success measurement, and a network traffic measurement.

In accordance with a 34th exemplary aspect of the present disclosure, which may be used in combination with any one or more of the preceding aspects (e.g., the 29th aspect), wherein a compute resource with higher performance is available to hosts of the first plurality of hosts than to hosts of the second plurality of hosts. In accordance with a 35th exemplary aspect of the present disclosure, which may be used in combination with any one or more of the preceding aspects (e.g., the 34th aspect), wherein the compute resource is one of processor speed, processor count, graphical processor speed, graphical processor count, memory size, memory bandwidth, storage type, storage size, storage bandwidth, network bandwidth, network latency, and overcommit buffer.

Aspects of the subject matter described herein may be useful alone or in combination with one or more other aspects described herein. In a 36th exemplary aspect of the present disclosure, a method comprises: receiving a first workload from a first account with a first profile in a profile repository; scheduling the first workload to a first plurality of hosts based on the first profile; determining that the first plurality of hosts lacks compute capacity for the first workload; evicting, based on a workload repository, a second workload executing on the first plurality of hosts; and assigning the first workload to the first plurality of hosts and the second workload to a different second plurality of hosts.

In accordance with a 37th exemplary aspect of the present disclosure, which may be used in combination with any one or more of the preceding aspects (e.g., the 36th aspect), wherein the profile repository includes a plurality of profiles including the first profile, and each profile of the plurality of profiles is associated with a respective account. In accordance with a 38th exemplary aspect of the present disclosure, which may be used in combination with any one or more of the preceding aspects (e.g., the 36th aspect), wherein the first profile includes at least one of an account age, an account access frequency, an account success frequency, a rate of activity, a presence factor, a request source, and a priority adjustment factor. In accordance with a 39th exemplary aspect of the present disclosure, which may be used in combination with any one or more of the preceding aspects (e.g., the 38th aspect), wherein the first profile includes historical compute resource consumption measurements of at least one of a first account and the first workload. In accordance with a 40th exemplary aspect of the present disclosure, which may be used in combination with any one or more of the preceding aspects (e.g., the 38th aspect), wherein the first profile includes at least one of a build success measurement, a deployment success measurement, and a network traffic measurement.

In accordance with a 41st exemplary aspect of the present disclosure, which may be used in combination with any one or more of the preceding aspects (e.g., the 36th aspect), wherein a compute resource with higher performance is available to hosts of the first plurality of hosts than to hosts of the second plurality of hosts. In accordance with a 42nd exemplary aspect of the present disclosure, which may be used in combination with any one or more of the preceding aspects (e.g., the 41st aspect), wherein the compute resource is one of processor speed, processor count, graphical processor speed, graphical processor count, memory size, memory bandwidth, storage type, storage size, storage bandwidth, network bandwidth, network latency, and overcommit buffer.

Aspects of the subject matter described herein may be useful alone or in combination with one or more other aspects described herein. In a 43rd exemplary aspect of the present disclosure, a computer-readable non-transitory storage medium storing executable instructions, which when executed by a computer system, cause the computer system to: receive a first workload from an account with a profile in a profile repository; schedule the first workload to a first plurality of hosts based on the profile; determine that the first plurality of hosts lacks compute capacity for the first workload; evict, based on a workload repository, a second workload executing on the first plurality of hosts; and assign the first workload to the first plurality of hosts and the second workload to a different second plurality of hosts.

Aspects of the subject matter described herein may be useful alone or in combination with one or more other aspects described herein. In a 44th exemplary aspect of the present disclosure, a system comprises: a means for receiving a first workload from a first account with a profile in a profile repository; a means for scheduling the first workload to a first plurality of hosts based on the profile; a means for determining that the first plurality of hosts lacks compute capacity for the first workload; a means for evicting, based on a workload repository, a second workload executing on the first plurality of hosts; and a means for assigning the first workload to the first plurality of hosts and the second workload to a different second plurality of hosts.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a plurality of nodes hosting at least a first plurality of guests and a second plurality of guests;
an orchestrator including a usage monitor, a workload classifier, and a scheduler executing on one or more processors to:
track, by the usage monitor, respective usage patterns of a plurality of accounts including a first account;
receive, from the first account, a first workload, wherein the first account has a first account factor based on the respective usage patterns in historical profile data of the first account and a second account factor of whether a user is actively logged into the first account;
recording, by the usage monitor, as the second account factor, that the user is actively logged into the first account when the first workload is received, wherein the first account factor and the second account factor are combined into an account priority score;
assign, by the workload classifier, the first workload to a first workload type of a plurality of workload types; and
assign, by the scheduler, the first workload to the first plurality of guests based on the first workload type and the account priority score based on the first account factor and the second account factor.

2. The system of claim 1, wherein the usage monitor stores a plurality of account factors including the first account factor in a profile repository.

3. The system of claim 1, wherein a first compute resource has higher performance than a second computer resource, and the first compute resource is available to guests of the first plurality of guests and unavailable to guests of the second plurality of guests.

4. The system of claim 3, wherein the compute resource is one of processor speed, processor count, graphical processor speed, graphical processor count, memory size, memory bandwidth, storage type, storage size, storage bandwidth, network bandwidth, network latency, and overcommit buffer.

5. The system of claim 1, wherein at least one compute resource used by the first workload is programmatically limited.

6. The system of claim 1, wherein the first account factor includes at least one of an account age, an account access frequency, an account success frequency, a rate of activity, a presence factor, a request source, and a priority adjustment factor.

7. The system of claim 6, wherein the account success frequency includes at least one of a build success measurement, a deployment success measurement, and a network traffic measurement.

8. The system of claim 1, wherein each workload type of the plurality of workload types includes compute resource requirements.

9. The system of claim 1, wherein the first workload type and a second workload type have the same compute resource requirements and the first workload type includes a first target completion time shorter than a second target completion time of the second workload type.

10. The system of claim 1, wherein a second workload is terminated on the first plurality of guests in response to the first workload being assigned to the first plurality of guests.

11. The system of claim 1, wherein the first workload is prioritized over a second workload in a workload queue.

12. A method comprising:
tracking respective usage patterns of a plurality of accounts including a first account;
receiving a first workload, wherein the first account has a first account factor based on the respective usage patterns in historical profile data of the first account and a second account factor of whether a user is actively logged into the first account;
recording, as the second account factor, that the user is actively logged into the first account when the first workload is received;
combining the first account factor and the second account factor into an account priority score;
assigning the first workload to a first workload type of a plurality of workload types; and
assigning the first workload to a first plurality of guests based on the first workload type and the account priority score based on the first account factor and the second account factor.

13. A system comprising:
a first plurality of hosts and a different second plurality of hosts;
an orchestrator including a profile repository, a workload repository, and a scheduler executing on one or more processors to:
receive a first workload from a first account with a first profile in the profile repository, wherein the first account has a first account factor based on usage patterns in historical profile data of the first account and a second account factor of whether a user is actively logged into the first account;
record, as the second account factor, that the user is actively logged into the first account when the first workload is received;
combine the first account factor and the second account factor into an account priority score;
schedule the first workload to the first plurality of hosts based on the first profile;
determine that the first plurality of hosts lacks compute capacity for the first workload;
evict, based on the workload repository, a second workload executing on the first plurality of hosts; and
assign, by the scheduler, the first workload to the first plurality of hosts based on the account priority score, based on the first account factor and the second account factor, and the second workload to the second plurality of hosts.

14. The system of claim 13, wherein the profile repository includes a plurality of profiles including the first profile, and each profile of the plurality of profiles is associated with a respective account.

15. The system of claim 13, wherein the first profile includes at least one of an account age, an account access frequency, an account success frequency, a rate of activity, a presence factor, a request source, and a priority adjustment factor.

16. The system of claim 15, wherein the first profile includes historical compute resource consumption measurements of at least one of a first account and the first workload.

17. The system of claim 15, wherein the first profile includes at least one of a build success measurement, a deployment success measurement, and a network traffic measurement.

18. The system of claim 13, wherein a first compute resource has higher performance than a second computer resource, and the first compute resource is available to hosts of the first plurality of hosts and unavailable to hosts of the second plurality of hosts.

19. The system of claim 18, wherein the compute resource is one of processor speed, processor count, graphical processor speed, graphical processor count, memory size, memory bandwidth, storage type, storage size, storage bandwidth, network bandwidth, network latency, and overcommit buffer.

* * * * *